United States Patent
Fischer

[15] 3,700,993
[45] Oct. 24, 1972

[54] APPARATUS FOR CONTROLLING RELATIVE MOTION BETWEEN GAGE JAWS ON A CONTACTING GAGE

[72] Inventor: Thomas R. Fischer, Cincinnati, Ohio
[73] Assignee: Cincinnati Milacron, Inc., Cincinnati, Ohio
[22] Filed: May 27, 1971
[21] Appl. No.: 147,432

[52] U.S. Cl..................................318/603, 318/600
[51] Int. Cl..............................................G05b 19/28
[58] Field of Search........318/603, 608, 600, 601, 646

[56] References Cited

UNITED STATES PATENTS

| | | | |
|---|---|---|---|
| 3,532,955 | 10/1970 | Henegar | 318/608 |
| 3,400,314 | 9/1968 | Wilson | 318/608 X |
| 3,519,904 | 7/1970 | Rogers | 318/608 |
| 3,564,379 | 2/1971 | Bakel et al. | 318/608 |
| 3,611,101 | 10/1971 | Kiffmeyer | 318/603 |

Primary Examiner—Benjamin Dobeck
Attorney—Howard T. Keiser and C. Richard Eby

[57] ABSTRACT

An apparatus for controlling the relative motion and final position between gage jaws on a contacting type of gage. A driving mechanism is coupled to one of the gage jaws to provide relative motion between said jaws. A command circuit supplies command signals to the driving mechanism. Each time the driving mechanism is commanded to move, a feed back circuit measures the actual motion of the gage jaw and produces a control signal in response to a predetermined magnitude of said motion. The control signal is used to gate a subsequent command signal to the driving mechanism. Consequently, the gage jaw can be brought in contact with a workpiece and held in position thereon without the danger of damage to the workpiece.

4 Claims, 4 Drawing Figures

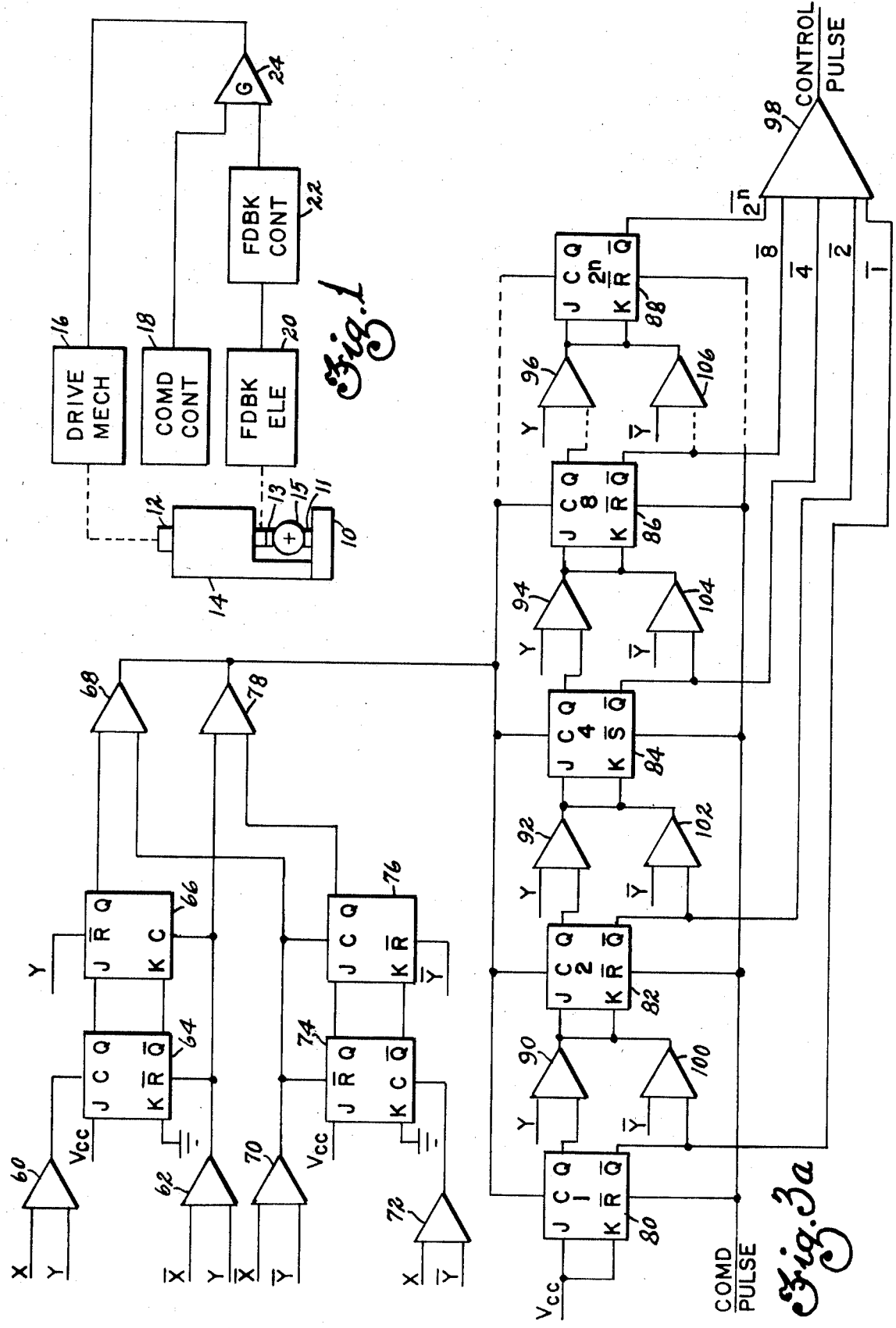

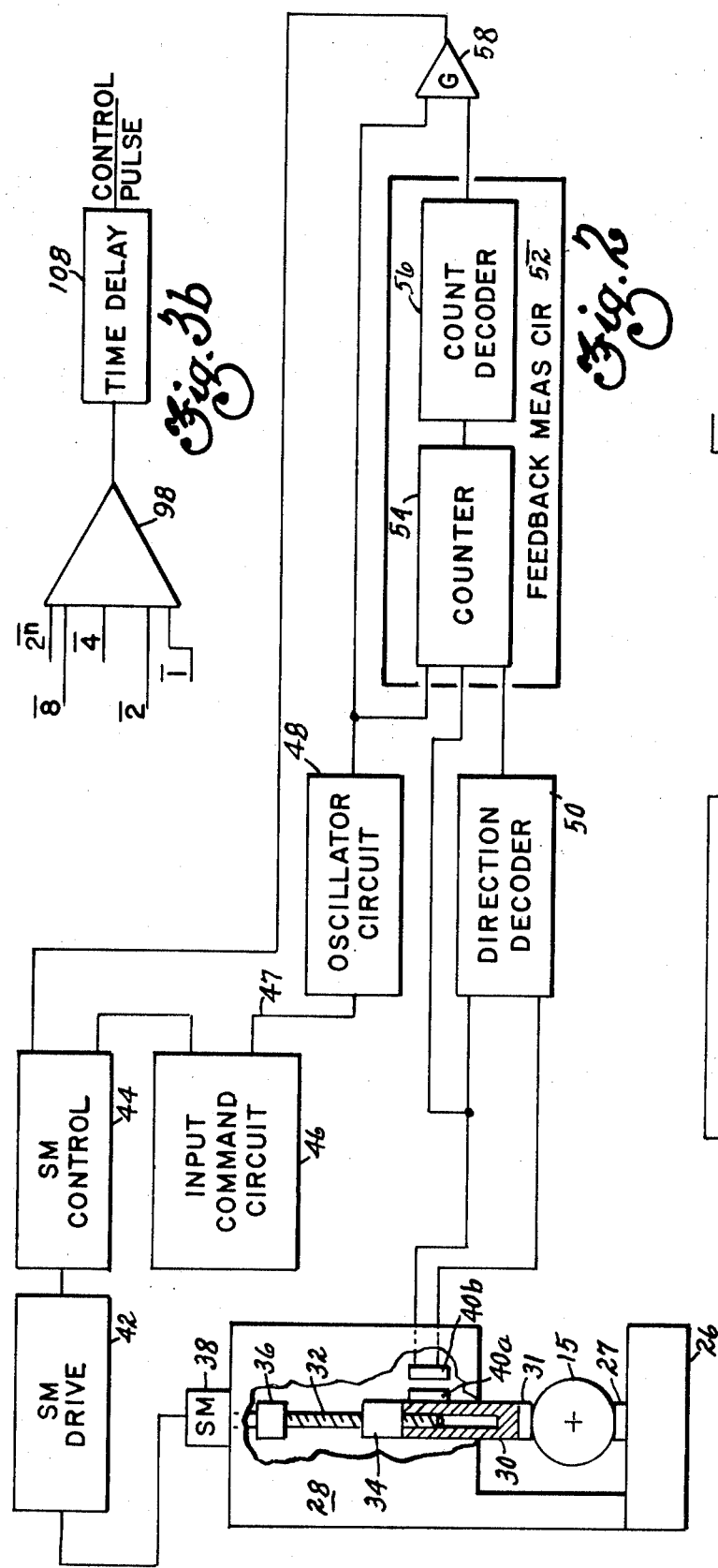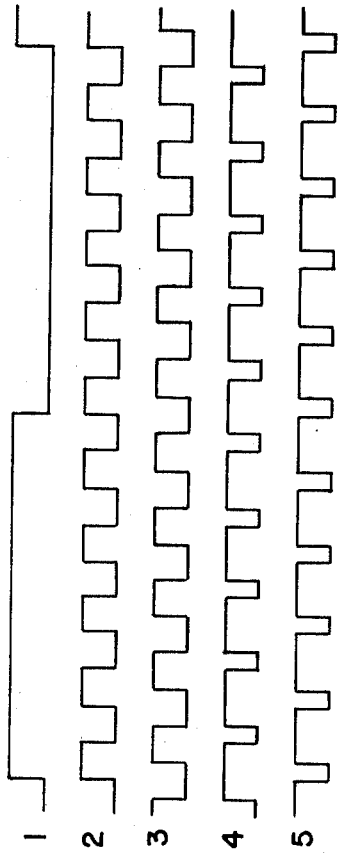

APPARATUS FOR CONTROLLING RELATIVE MOTION BETWEEN GAGE JAWS ON A CONTACTING GAGE

BACKGROUND OF THE INVENTION

The invention relates generally to the area of gage controllers. Specifically, the invention provides a control for a contacting type of gage which automatically brings the gage jaws in contact with the workpiece in a manner permitting an accurate measurement thereof.

There are several automatically controlled gages shown in the prior art; however, these gages are pneumatically operated and are generally non-contacting gages. Non-contacting gages are more readily adapted to an automatic control because the relative position of the gage jaws with respect to the workpiece is less critical than in a contacting gage. However, a non-contacting pneumatic gage is more susceptible to contamination and inaccuracies than a contacting gage. This is a result of air and coolant films that surround the workpiece and influence the measurement.

Generally, because of its greater reliability and accuracy, an electronic gage is more desirable than a pneumatic gage. However, contact pressure is a very critical parameter that is difficult to place under automatic control. The ultimate contact pressure is always a compromise. For example, a minimal contact pressure is desirable because the accuracy is greater. Further, errors due to structural deflections of the gage are less; and the marking of the part is held to a minimum. But, as a practical matter, the contact pressure must be increased to guarantee a high degree of repeatability of the contact force. In addition a higher contact pressure is required for the gage anvils to penetrate any fluid films surrounding the workpiece. The above problem is further complicated when placing a contacting gage under automatic control. Generally, the anvils on each gage jaw have a relatively small area of contact with the workpiece. Therefore, only a minimal force is required for the anvils to pierce the fluid films surrounding the workpiece. However, in order to guarantee that the gage is always measuring a true diameter, the anvils in an automatic gage have a larger area of contact on the workpiece. Hence, a greater contact pressure is necessary. In view of the above, one can readily appreciate why the control of contacting gages has been slow to develop. Applicant proposes an apparatus for automatically controlling a contacting gage. The apparatus accurately brings the gage jaws in contact with the workpiece and maintains an effective contact pressure without damaging the surface of the workpiece.

SUMMARY OF THE INVENTION

The present invention discloses an apparatus for use with a gaging device wherein a relative motion between two gage jaws is generated by a driving mechanism in response to a command signal. A feed back element senses the actual relative motion between the gage jaws and produces feed back signals. A feed back control circuit is responsive to the feed back signals to produce a control signal in response to a predetermined magnitude of relative motion. The control signal is operative to control the application of successive command signals to the driving mechanism.

BRIEF DESCRIPTION OF THE DRAWINGS

FIG. 1 is a general block diagram of the invention.

FIG. 2 is a detailed block diagram of the preferred embodiment invention.

FIG. 3a is a detailed schematic diagram of the direction decoder and reversible counter used in applicant's invention.

FIG. 3b is detailed schematic diagram of an alternative embodiment of the count decoder.

FIG. 4 is a timing diagram illustrating the operation of the direction decoder and counter.

DESCRIPTION OF THE PREFERRED EMBODIMENT

FIG. 1 is a general block diagram of the invention. FIG. 1 illustrates the general gage configuration, and it should be understood that the gage construction disclosed does not place a limitation on the application of the disclosed invention. It should further be noted that the positioning of the gage structure itself with respect to the center line of the workpiece is shown in the prior art and deemed to be within the knowledge of those who are skilled in the art. Applicant's disclosed invention pertains to the control of the gage jaws themselves.

The gage contains a lower jaw 10 and upper jaw 12. The upper jaw 12 is movably mounted in the structure 14 and is under the influence of a mechanical bias. The structure of the gage head will be described in more detail later in the specification. Anvils 11 and 13 are located on the lower and upper jaws 10 and 12 respectively and are operative to contact the workpiece 15 when the gage jaws are brought together. A driving mechanism 16 is mechanically coupled to the upper jaw 12 to provide a linear motion of the upper jaw 12 with respect to the lower jaw 10. The driving mechanism is responsive to a command signal produced by a command control 18. There are a number of driving mechanisms that may be used. For example, the driving mechanism may be a piston and cylinder, an electrohydraulic motor or an electric motor. In addition, the command circuit 18 may have its signals generated by a manual selection of switches or may be derived from a programmed input. The generation of command signals which are necessary for any particular driving mechanism is well-known to those who are skilled in the art. A feed back element 20 is coupled to the gage jaws and generates feed back signals defining the direction and magnitude of motion of the upper jaw 12 with respect to the lower jaw 10. A feed back control circuit 22 is responsive to the feed back signals to produce a control signal in response to a relative motion between the jaws of a predetermined magnitude and in a predetermined direction. The control signal is one input of a gating network 24 having another input responsive to the command signal and an output connected to the driving mechanism. The gating network 24 is operative to apply a command signal to the driving mechanism in response to the occurrence of a control signal, and the gating network 24 terminates the command signal output to the driving mechanism in response to an absence of the control signal. Hence, the driving mechanism is only supplied with a command signal if the upper jaw has moved a predetermined distance in response to a prior command signal. Consequently, the upper jaw can be stopped almost exactly on the surface of the workpiece thereby limiting the contact pressure and providing an accurate gaging condition. Because the upper jaw is mounted in the structure 14 under a mechanical bias the contact pressure can be increased by continuing the application of the command signal for a predetermined period of time.

FIG. 2 is a detailed block diagram of the preferred embodiment of the invention. A lower gage jaw 26 containing an anvil 27 is fixed to a gage structure 28. An upper gage jaw 30 containing an anvil 31 is slidably mounted within the structure 28. A ball screw 32 is rotatably mounted at one end to a nut 34 rigidly fixed to the upper jaw 30. The other end of the ball screw 32 is connected through a coupling 36 to a stepping motor 38. The coupling 36 permits a substantial axial motion but does not allow any rotational motion between the stepping motor and ball screw. Further, the coupling 36 is under a mechanical bias which provides a force on the upper jaw toward the workpiece. Consequently, the ball screw 32, nut 34 and upper jaw 30 float with respect to the stepping motor 38 and gage structure 28. Gages of this structure are commercially available, and further disclosure of the gage itself should be unnecessary.

The stepping motor 38 is energized by a stepping motor drive circuit 42 which generally is supplied with any commercial stepping motor. The stepping motor drive circuit 42 is energized by a stepping motor control circuit 44. The stepping motor control circuit is responsive to an input command circuit 46 which produces signals defining when and in what direction the stepping motor is to move. In addition, the control circuit 44 is responsive to command pulses from an oscillator circuit 48. Each command pulse defines an increment of motion of the stepping motor 38 and hence the upper gage jaw 30. The frequency of occurrence of the command pulses determines the velocity of the motor 38. The input command circuit 46 also produces signals on line 47 to the oscillator circuit 48 which are operative to change the frequency of the oscillator output and hence the velocity of the motor 38. From the diagram of FIG. 2, it can be readily appreciated that the stepping motor 38, stepping motor drive 42 and stepping motor control circuits 44 operate as a driving mechanism. Further, the oscillator circuit 48 and input command circuits 46 combine to function as a command control. Since the use of stepping motors and their control is generally well-known; and further, since a particular embodiment of a driving mechanism is not important to the disclosed invention, the circuits discussed above need not be shown in more detail.

Affixed to the upper jaw 30 is a portion of a feed back element 40a which has a mating portion 40b affixed to the gage structure 28. The feed back element 40 is operative to produce two feed backs signals. Each signal being a square wave, and said signals being 90° out of phase with each other. The feed back signals are input to a direction decoder 50 which is operative to detect which direction the upper gage jaw 30 is moving. An output signal from the direction decoder 50 is input to a feed back measuring circuit 52 comprised of a reversible counter 54 and a count decoder 56. The counter 54 measures the magnitude of motion of the upper jaw 30 in both directions and the count decoder 56 produces a control signal in response to a predetermined magnitude of motion in a particular direction. The control signal is input to a gating network 58 having another input connected to the oscillator circuit 48 and an output connected to the stepping motor control circuit 44. The control signal is operative to control the application of command pulses to the stepping motor control circuit 44 as a function of the actual distance moved by the upper gage jaw in response to previous command pulses. The operation of this circuit will be made clearer by reference to FIGS. 3 and 4.

FIG. 3a is a detailed schematic diagram of the direction decoder and the reversible counter. FIG. 4 is a timing diagram of various signals within the feed back control circuit. Curve 1 of FIG. 4 represents one period of a command pulse from the oscillator circuit 48, and said period represents a predetermined increment of motion of the upper gage jaw 30, e.g., 0.002 inches. Curves 2 and 3 represent feed back signals from the feed back element 40. Curve 2 will arbitrarily be called the X-feed back signal, and curve 3 the Y-feed back signal. Further it should be noted that the feed back signals are 90° out of phase. In addition, there are a number of, e.g., 10, feed back signal periods in each period of the command pulse. Therefore, with the example values used above each period of the X and Y feed back signals represents 0.0002 inches of motion of the upper gage jaw. In FIG. 3a, the direction decoder is sensitive to the 90° phase shift between the feed back signals for determining the direction of motion. NAND gates 60, 62 and 68 and flip flops 64 and 66 detect the relationship between the X-feed back signal and the Y-feed back signal. If the upper jaw 30 is moving toward the lower jaw 26, the above logic elements will generate an output on NAND 68 which may be represented by curve 4 of FIG. 4. If the upper jaw 30 is moving away from the lower jaw 26, the above elements will not produce any signal on the output of NAND 68. However, this motion will cause NAND gates 70, 72 and 78 and flip flops 74 and 76, which detect the relationship of the X-feed back signal to the not Y-feed back signal, to produce an output from the gate 78. Therefore, motion of the upper gage jaw away from the lower gage jaw produces an output signal from the NAND gate 78 which is represented by the curve of 5 of FIG. 4.

The output of gages 68 and 78 are tied together and used as a clocking signal in the reversible counter comprised of flip flops 80 through 88. The particular embodiment of the counter is an arbirtrary design decision. For example, there are 10 feed back signals periods for each period of the command pulse. Therefore, on each command pulse the quantity 10 could be set into the counter and the feed back signals used to clock the counter to zero. Hence, the detected zero state could then be used to gate the next command pulse. However, applicant has chosen to use the command pulse itself to set a number in to the counter. Consequently, the counter will be inoperative for one half of the command pulse; and therefore, one will only be able to count five feed back signal periods. Further, since the system cannot be depended upon to move exactly 0.002 inches for each command pulse, it is unreasonable to expect exactly five feed back signal periods during one half a period of the command pulse.

However, one would always expect to see four feed back signal periods. Therefore, the command pulse signal is used to set flip flop 84 in the counter. Setting this flip flop represents the loading of a number 4. As the upper gage jaw proceeds toward the workpiece, one-half of each command pulse period is used to set the number 4 into the counter; and during the other half cycle clock pulses produced by the NAND gate 68 in conjunction with NAND gates 90 through 96 cause the counter to count down to zero. The zero state is detected by a count decoder comprised of NAND gate 98 which produces a control signal in response to the zero state. The control signal is used to gate another command pulse to the driving mechanism as earlier described, and the counting process repeats.

Eventually a point is reached where the upper gage jaw contacts the workpiece. As a result, the termination of motion is indicated by the termination of feed back signals. Hence, the counter does not reach a zero state, and no further command pulses are gated to the driving mechanism because no more control signals are produced. The gage jaws are resting on the surface of the workpiece, and the measuring process by the gage begins. As a practical matter, with the feed back element sensitive to a motion of 0.0002 inches or more, the feed back signals do not terminate. The surface of the workpiece may be rough, and the workpiece may be out of round. Consequently, the gage jaws continuously move away from and toward the center line of the workpiece as a function of the eccentricities in the surface of the workpiece. The feed back signals are continuously indicating an oscillatory motion. The magnitude of this motion is measured by the counter circuit. If the gage jaw moves out, the clock pulses produced by NAND gate 78 along with NAND gates 100 through 106 cause the counter to count up; and as the gage jaw moves toward the workpiece, the counter counts down. Therefore, with respect to any particular command pulse, the counter maintains a signal representing the absolute value of motion of the gage jaw; and a subsequent command pulse will not be applied to the driving mechanism until a particular magnitude of motion, e.g., 4 counts or 0.0008 inches, is detected toward the workpiece.

As described earlier, the gaging pressure must be heavy enough to hold the gage jaws firmly in place, but light enough to produce an accurate and reliable measurement of the workpiece. With the upper gage jaw under the influence of a mechanical bias, the gaging pressure may be increased by applying successive command pulses to the driving mechanism after the upper gage jaw comes in contact with the workpiece. Therefore, as shown in FIG. 3b, it may be desirable to use a time delay 108 to control the gating of command pulses. Each time the NAND gate 98 produces an output signal indicating a predetermined position of the gage jaw, the time delay is initiated and produces a control signal gating successive command pulses for the time constant of the time delay. In the situation where the upper gage jaw contacts the workpiece, output signals from the NAND gate 98 terminate; and the time delay permits a number of extra command pulses to increase the gaging pressure. Hence, the time constant of the time delay will determine the magnitude of the gaging pressure. The design and operation of time delays are well-known to those who are skilled in the art, and further discussion should not be necessary.

In summary, in a gaging apparatus where the gage jaws are controlled by a positive mechanical driving mechanism, an apparatus is provided for positively controlling the relative motion between the gage jaws. The control is obtained by measuring the motion of the jaws and controlling the excitation of the driving mechanism as a function of the actual magnitude of motion of said jaws. Therefore, when the gage jaws contact the workpiece, no further motion is detected; and the operation of the driving mechanism is terminated. Further, it is disclosed how to use the above system to adjust the gaging pressure on the workpiece.

While invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling relative motion between gage jaws in a gaging device, one of said gage jaws being coupled to a driving mechanism for moving it relative to the other gage jaw in response to command pulses representing predetermined commanded increments of motion, the apparatus comprising:
   a. a feedback element connected to the gage jaws and being responsive to a first command pulse for producing two periodic pulse trains shifted in phase 90° with respect to each other, said pulse trains having a period representing a predetermined magnitude of motion being a predetermined fraction of the commanded increment of motion;
   b. a direction decoder connected to the feedback element for detecting the direction of the relative motion between the gage jaws;
   c. a reversible counter responsive to the first command pulse and connected to the feedback element and the direction decoder for measuring the magnitude of the relative motion between the gage jaws;
   d. a count decoder connected to the counter for producing a control signal in response to a predetermined magnitude of motion measured by the counter in a predetermined direction; and
   e. a gating network responsive to the control signal and the command pulses and having an output connected to the driving mechanism for producing a second command pulse to the driving mechanism in response to the control signal and inhibiting the production of the second command pulse to the driving mechanism in response to an absence of the control signals.

2. The apparatus of claim 1 wherein a time delay is connected between the count decoder and the gating network for maintaining the control signal for a predetermined period of time.

3. An apparatus for use with a gaging device for controlling motion of a first gage jaw relative to a second gage jaw, said motion being generated by a driving mechanism coupled to the gaging device and operating in response to a first command signal representing a predetermined increment of motion, the apparatus comprising:

a. means responsive to the relative motion between the gage jaws for producing two feedback signals, each feedback signal representing a predetermined fraction of the increment of motion;

b. means responsive to the feedback signals for producing a control signal in response to a predetermined number of one of said feedback signals occurring during a relative motion in a predetermined direction; and c. means responsive to the control signal and having an output connected to the driving mechanism for controlling the application of a second command signal to the driving mechanism.

4. An apparatus for controlling relative motion between first and second gage jaws of a gaging device, said relative motion being generated by a driving mechanism connected to the gaging device and operating in response to command pulses, each command pulse representing a predetermined increment of motion, the apparatus comprising:

a. means responsive to a relative motion between the gage jaws produced by a first command pulse for producing periodic feedback signals, each feedback signal having a period representing a fraction of the predetermined increment of motion, and one of said feedback signals being displaced in time by one quarter of a period with respect to the other feedback signal;

b. means responsive to the feedback signals for detecting the direction of motion of the first gaged jaw with respect to the second gage jaw;

c. means connected to the detecting means and responsive to one of the feedback signals and the first command pulse for producing a control signal in response to a predetermined number of the one of the feedback signals occurring during a relative motion in a predetermined direction; and d. means responsive to the control signal and a second command pulse and having an output connected to the driving mechanism for supplying said second command pulse to the driving mechanism in response to the control signal.

* * * * *